US012717255B2

(12) United States Patent
Noguchi

(10) Patent No.: US 12,717,255 B2
(45) Date of Patent: Aug. 25, 2026

(54) IMAGE FORMING APPARATUS

(71) Applicant: CANON KABUSHIKI KAISHA, Tokyo (JP)

(72) Inventor: Bunro Noguchi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/077,848

(22) Filed: Mar. 12, 2025

(65) Prior Publication Data

US 2025/0291282 A1 Sep. 18, 2025

(30) Foreign Application Priority Data

Mar. 13, 2024 (JP) ................................. 2024-038969

(51) Int. Cl.

*G03G 15/16* (2006.01)
*G03G 15/00* (2006.01)
*G03G 15/02* (2006.01)
*G03G 21/16* (2006.01)

(52) U.S. Cl.

CPC ..... *G03G 15/1675* (2013.01); *G03G 15/0266* (2013.01); *G03G 15/1645* (2013.01); *G03G 15/1665* (2013.01); *G03G 15/167* (2013.01); *G03G 15/5004* (2013.01); *G03G 21/168* (2013.01)

(58) Field of Classification Search

CPC ........... G03G 15/0266; G03G 15/1645; G03G 15/1665; G03G 15/167; G03G 15/1675; G03G 15/5004; G03G 21/168

See application file for complete search history.

(56) References Cited

U.S. PATENT DOCUMENTS 11,243,485 B2 2/2022 Kobayashi et al.
2010/0028026 A1 2/2010 Inami et al.
2013/0322902 A1* 12/2013 Miyahara ........... G03G 15/0194 399/50
2021/0063920 A1* 3/2021 Kobayashi ......... G03G 15/1675
2023/0297003 A1* 9/2023 An ..................... G03G 15/0275 399/50

FOREIGN PATENT DOCUMENTS

JP 2010-038973 A 2/2010
JP 2020-0134731 A 8/2020
JP 2021-033244 A 3/2021

* cited by examiner

*Primary Examiner* — Joseph S Wong
(74) *Attorney, Agent, or Firm* — Venable LLP

(57) ABSTRACT

An image forming apparatus incudes an image bearing member, a developing member, a transferring member, an applying portion, a cleaning blade, and a controller. The controller executes an initial operation in which the image bearing member in a brand-new state is shifted to a printable state and an image forming operation. The controller controls the applying portion so as to apply a constant voltage to the transfer member in the initial operation different from that in the image forming operation, during a second period immediately before a first period for supplying the toner from the developing member to the image bearing member in the developing region, and controls so that the constant voltage in the second period has a normal charge polarity of the toner and becomes a voltage value which does not generate electrical discharge between the image bearing member and the transfer member.

11 Claims, 6 Drawing Sheets

IMAGE FORMING APPARATUS

FIELD OF THE INVENTION AND RELATED ART

The present invention relates to an image forming apparatus.

Conventionally, an image forming device, which employs an electrophotographic method, charges a surface of a photosensitive drum uniformly by a charging member, and forms an electrostatic latent image on the photosensitive drum by exposing the surface of the photosensitive drum which is charged according to image information. Further, when a developing device develops the electrostatic latent image on the photosensitive drum by using a toner, a toner image is formed on the photosensitive drum, and a transfer member transfers the toner image onto a recording material such as paper. Further, the toner which remains on the photosensitive drum after it is transferred is removed from the photosensitive drum by a cleaning blade and collected. The image forming apparatus is easy in maintenance by integrating consumables such as the photosensitive drum, the charging member, the developing device and the cleaning blade into a process cartridge which is dismountable from the image forming apparatus.

By the way, in a case that a process cartridge in a brand-new state is mounted on the image forming apparatus, it is necessary to execute an initial operation to transit it to a state that it is possible to print. In the initial operation, a toner supply operation, in which the toner is supplied from the developing device to the cleaning blade, is mainly performed. In this way, damage is prevented due to peeling of the cleaning blade, while fine particles which are externally added to the toner are sent to a gap between the photosensitive drum and the cleaning blade and lubricity with the photosensitive drum is provided.

SUMMARY OF THE INVENTION

In response to the above issue, the image forming apparatus according to the present invention includes configurations as below.

(1) According to an aspect of the present invention, there is provided an image forming apparatus comprising: a rotatable image bearing member; a developing member configured to supply toner on a surface of the image bearing member in a developing region contacting the image bearing member and form a toner image; a transferring member configured to transfer the toner image to a transfer member from the image bearing member; an applying means configured to apply a voltage to the transfer member; a cleaning blade configured to clean the toner remaining on the image bearing member after transferring the toner image to the transfer member; and a controlling portion configured to execute an initial operation in which the image bearing member in a brand-new state is shifted to a printable state and an image forming operation in which the toner image is formed on the transfer member, wherein the controlling portion controls the applying means so as to apply a constant voltage to the transfer member in the initial operation different from that in the image forming operation, during a second period immediately before a first period for supplying the toner from the developing member to the image bearing member in the developing region, and controls the applying means so that the constant voltage applied to the transfer member in the second period has a normal charge polarity of the toner and becomes a voltage value which does not generate electrical discharge between the image bearing member and the transfer member.

Further features of the present invention will become apparent from the following description of exemplary embodiments with reference to the attached drawings.

DESCRIPTION OF THE EMBODIMENTS

First Embodiment

In the following, a first embodiment of the present invention will be specifically described. In this embodiment, a toner supply operation at a time of executing an initial operation to transit a process cartridge 13 in a brand-new state to a state that it is possible to print by mounting it to an image forming apparatus 12, and a voltage control which is applied to a transfer roller 4 immediately before that will be described.

<Description of the Image Forming Apparatus and an Image Forming Operation>

Figure 1:
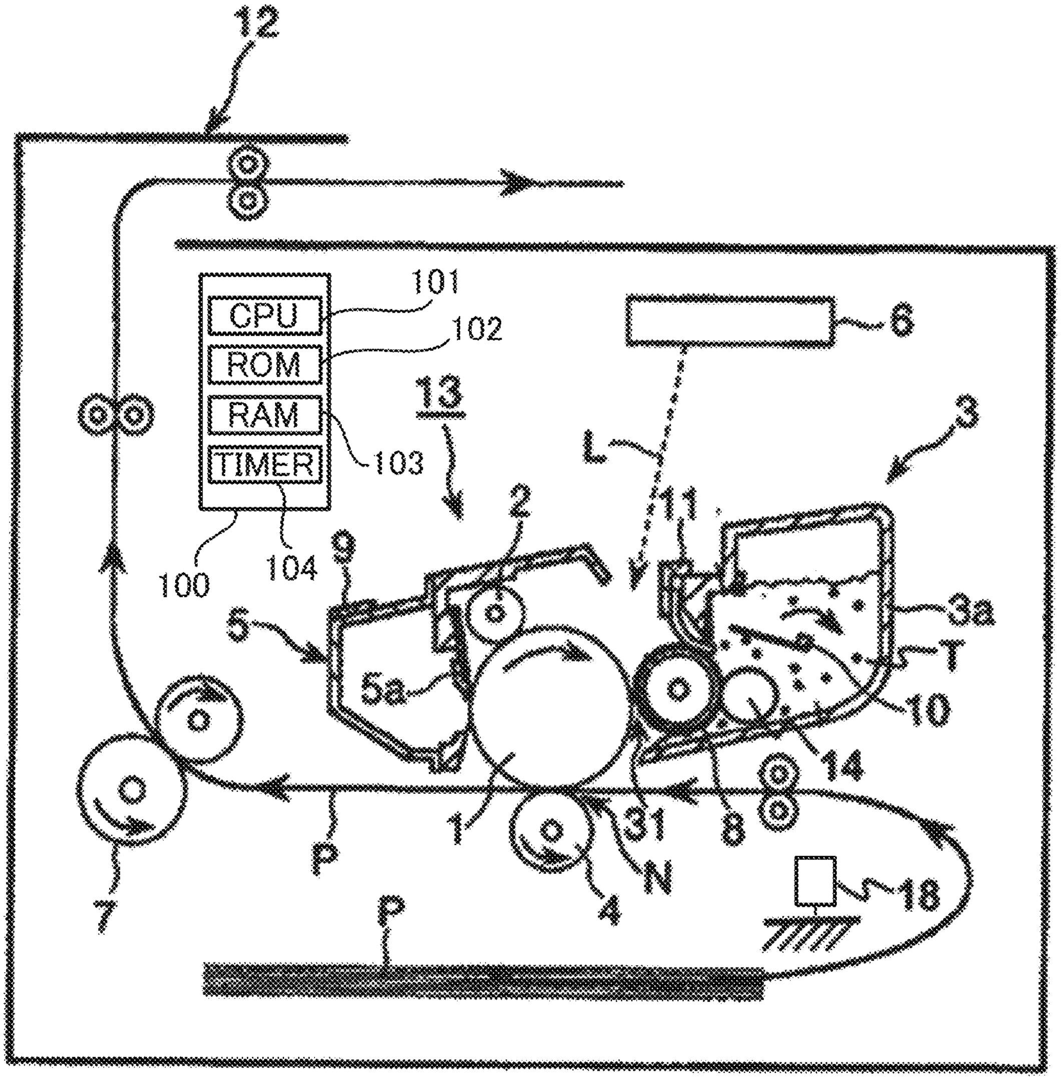
FIG. 1 is a view showing a schematic structure of an image forming apparatus according to a first embodiment, a second embodiment and a third embodiment.
Figure 2:
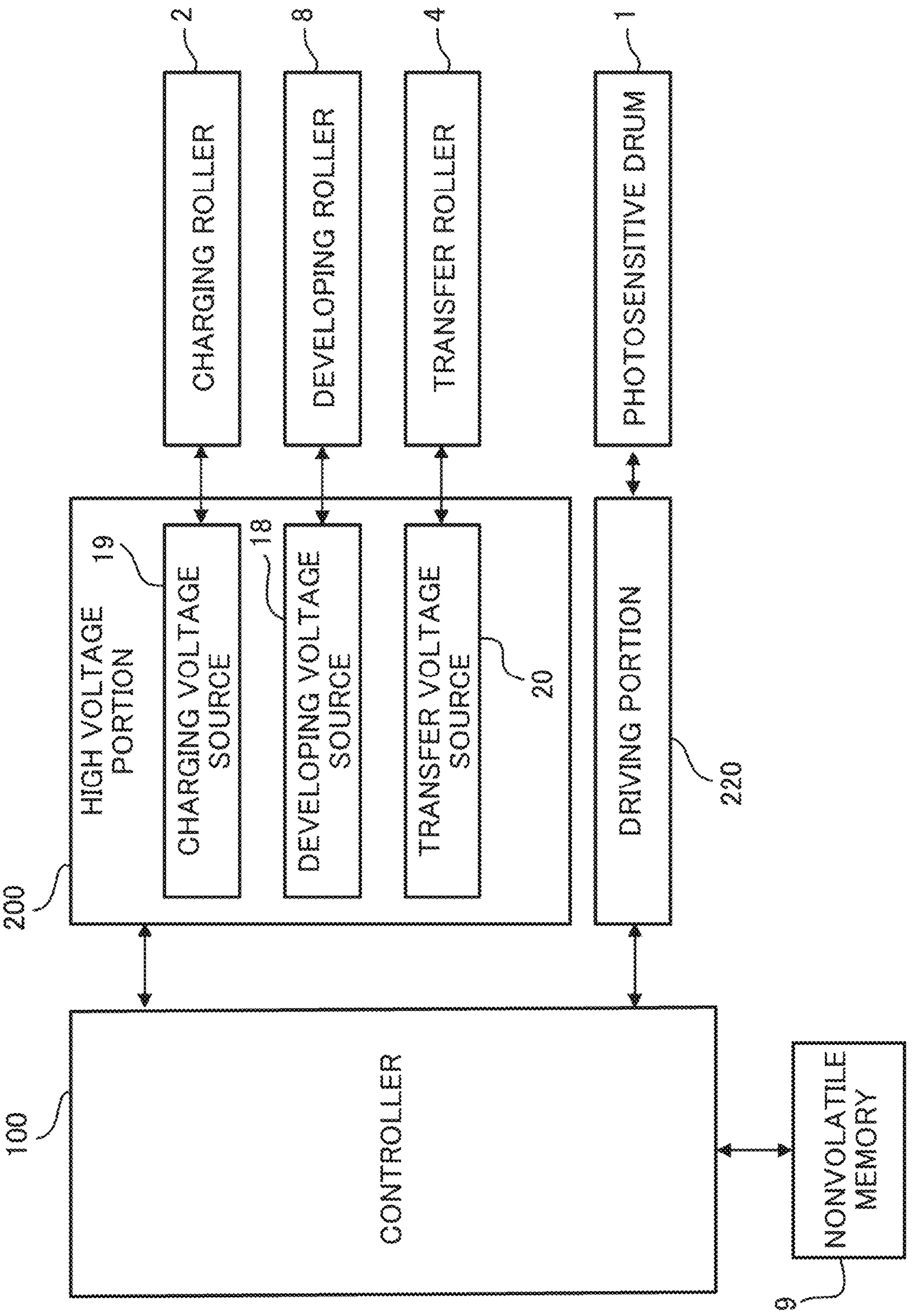
FIG. 2 is a block diagram of the image forming apparatus according to the first embodiment, the second embodiment and the third embodiment.

FIG. 1 shows a schematic configuration of an electrophotographic laser beam printer as an image forming apparatus according to the first embodiment. Further, FIG. 2 shows a block diagram of the image forming apparatus according to the first embodiment. The image forming apparatus 12, which employs electrophotographic technology according to the first embodiment, is provided with a drum shape electrophotographic photosensitive member (hereafter referred to as a "photosensitive drum") 1 as an image bearing member. The photosensitive drum 1 is surrounded by a charging roller 2, an exposure device 6, a developing device 3, a transfer roller 4 and a cleaning device 5, which are arranged in an order along a rotational direction of the photosensitive drum 1 (clockwise direction) which is shown by arrows in FIG. 1. Further, a fixing device 7 is arranged on a downstream side of a transfer material P in a transfer nip portion N which is formed between the photosensitive drum 1 and the transfer roller 4.

Further, the image forming apparatus 12 is provided with a control portion 100. The control portion 100 includes a CPU 101, a ROM 102, a RAM 103 and a timer 104, for example. The CPU 101 executes a program which is stored in the ROM 102, and controls an overall operation of the image forming apparatus 12, while using the RAM 103 as a work area and a temporary storage area. The CPU 101 uses the timer 104 to manage time when performing a timing control in a control of the image forming apparatus 12. The control portion 100 controls a high voltage portion 200 (see FIG. 2). The control portion 100 also reads information from a nonvolatile memory 9 as a memory portion, and writes information to the nonvolatile memory 9. The high voltage portion 200 includes a charging voltage power source 19, a developing voltage power source 18 and a transfer voltage power source 20 (see FIG. 2).

<Detailed Description of the Image Forming Device>

In the first embodiment, the photosensitive drum 1 includes an OPC (organic photoconductor) photosensitive layer on a drum substrate which is made of aluminum. The photosensitive drum 1 is rotationally driven by a driving portion 220 (see FIG. 3), which is a driving means which is provided on a side of a main assembly of the image forming apparatus 12 in a direction of an arrow (clockwise direction) at a predetermined peripheral speed. The charging roller 2, which is a charging member, uniformly charges the photosensitive drum 1 with a predetermined polarity and potential by a charging voltage which is applied from the charging voltage power source 19, which is a second applying means. By applying a direct current voltage of −1100V as a charging voltage, a potential (hereafter referred to as a potential on the photosensitive drum) on the photosensitive drum 1 is set to a potential of Vd=−500V.

The exposure device 6 outputs laser light (exposure beam L) in which image information which is input from a personal computer (not shown), etc. is modulated in accordance with time sequence electrical digital image signal from a laser output portion (not shown) by a video controller (not shown). The exposure beam L forms an electrostatic latent image, which corresponds to the image information, by scanning and exposing a surface of the photosensitive drum 1 which is charged. In the first embodiment, the exposure beam L is irradiated so that a light portion potential Vl on the photosensitive drum 1 becomes −150V. The developing device 3 will be specifically described below.

The transfer roller 4, which is a transfer means, contacts the surface of the photosensitive drum 1 at a predetermined pressure and forms the transfer nip portion N, and a transfer voltage is applied from the transfer voltage power source 20, which is a first applying means (applying means). The toner image on the surface of the photosensitive drum 1 is transferred to the transfer material P such as a paper at the transfer nip portion N between the photosensitive drum 1 and the transfer roller 4 due to the transfer voltage.

The fixing device 7 includes a heating roller which is provided with a halogen heater (not shown) inside and a pressing roller. The fixing device 7 heats, melts and applies pressure to an unfixed toner image which is transferred to a surface of the transfer material P, and fixes it thermally and creates a permanent image, while nipping and conveying the transfer material P at the fixing nip portion between the fixing roller and the pressing roller. The transfer material P, which bears the permanent image which has already been fixed, is discharged from the image forming apparatus 12.

A cleaning blade 5*a*, which is a cleaning means, cleans the toner which is not transferred onto the photosensitive drum 1 and remains on the photosensitive drum 1, and the photosensitive drum 1 is used again for image forming. Incidentally, the photosensitive drum 1, the charging roller 2, the developing device 3, and the cleaning blade 5*a* are integrated into a single unit and form a process cartridge 13 (cartridge) which is dismountable from the main assembly of the image forming apparatus 12. The process cartridge 13 is provided with the nonvolatile memory 9 which stores various information related to the process cartridge 13.

<Details of the Developing Device>

Furthermore, the developing device 3, which is a developing member will be specifically described by using FIG. 1. The developing device 3 includes a developer container 3*a* which accommodates toner T to which externally added particles are added, a mixing member 10 which mixes the toner T, a developing roller 8, which is a toner carrying member, a supplying roller 14 which supplies the toner T to the developing roller 8, and a developing blade 11 which regulates a layer thickness of the toner T. The toner T is charged with negative polarity (negative polarity) as a normal polarity, and uses a magnetic single-component toner whose average particle diameter is 7 μm. That is, the normal charging polarity of the toner is negative in the first embodiment. Further, silica particles, whose particle diameter is 20 nm, are added to a surface of the toner T, as a toner external additive (externally added particle). The mixing member 10 includes a support bar and a mixing sheet. The support bar is supported at both end portions by the developer container 3*a* and rotates clockwise in FIG. 1. The mixing sheet is made of PPS sheet (polyphenylene sulfide sheet) whose thickness is 100 μm, and one of end portions of the mixing sheet in a short direction is press-bonded to the support bar.

The developing roller 8 contacts and opposes the surface of the photosensitive drum 1, and both end portions of the developing roller 8 are rotatably supported in an opening portion of the developing device 3, and the developing roller 8 rotates in the same direction as the photosensitive drum 1. The photosensitive drum 1 and the developing roller 8 are always contacted each other, and the image forming apparatus 12 according to the first embodiment does not include a spacing mechanism which spaces the developing roller 8 from the photosensitive drum 1. A developing area 31 is a portion in which the developing roller 8 and the photosensitive drum 1 are contacted to each other. Further, the developing roller 8 is connected to the developing voltage power source 18, which is arranged in the main assembly of the image forming apparatus 12 as a means of applying a developing voltage, and the developing voltage power source 18 applies the developing voltage Vdc=−400V, which is a direct current voltage, during printing. Further, when the process cartridge 13 is in a brand-new state, Tospearl™ (particle size from 1 to 2 μm) is applied to the surface of the developing roller 8 as a lubricant.

The supplying roller 14 is arranged so as to oppose and contact the surface of the developing roller 8, and the supplying roller 14 rotates in an opposite direction to the developing roller 8. The developing blade 11 is a blade, made of SUS sheet metal whose thickness is 1 mm, which is fixed to a support sheet metal. The support sheet metal is fixed to the developer container 3*a* so that it contacts the developing roller 8 at an appropriate contact pressure in order to appropriately regulate a layer thickness of the toner T and charge it by friction. Incidentally, in a case of the process cartridge 13 in a brand-new state, a sealing member (not shown) is adhered to the developer container 3*a* to prevent the toner T from leaking from an area in FIG. 1 for leak prevention of the toner during transportation, etc. FIG. 1 shows a state of the sealing member after it is opened.

Due to the configuration, the toner T is supplied to the surface of the developing roller 8 by the supplying roller 14. After that, the toner T on the surface of the developing roller 8 is optimized in layer thickness by the developing blade 11 and is charged by friction charging. The toner T, which is charged, visualizes the electrostatic latent image on the photosensitive drum 1 as a toner image in the developing area 31.

<Initial Operation of the Process Cartridge in a Brand-New State>

In a case that the process cartridge 13 in a brand-new state is mounted on the image forming apparatus 12, a special initial operation is required (hereafter, the operation is referred to as an initial operation). The initial operation is mainly divided into three periods, which are [1] a warming up rotating period, [2] a toner supplying operation period (first period) and [3] a blocking layer forming period (third period). These initial operations are controlled by the control portion 100.

In "[1] the warming up rotating period", the developing roller 8 is coated with the toner T appropriately throughout its entire area with respect to a longitudinal direction (which is also a direction of a rotational axis) during the period that rotatable members, such as the developing roller 8 in the process cartridge 13, are rotated (hereafter referred to as "warming up rotation"). Next, in "[2] the toner supplying operation period", the toner which is coated on the developing roller 8 is supplied to the cleaning blade 5*a* via the photosensitive drum 1, which is rotating. In the first embodiment, the toner, whose amount is equivalent to the entire area in the longitudinal direction that is an area of 250 mm in the length, is supplied. Finally, in "[3] the blocking layer forming period", the toner T which is supplied to the cleaning blade 5*a* is rolled by a rotational driving force of the photosensitive drum 1, and the silica particles which are externally added to the toner T, are transferred to the photosensitive drum 1.

Figure 3:
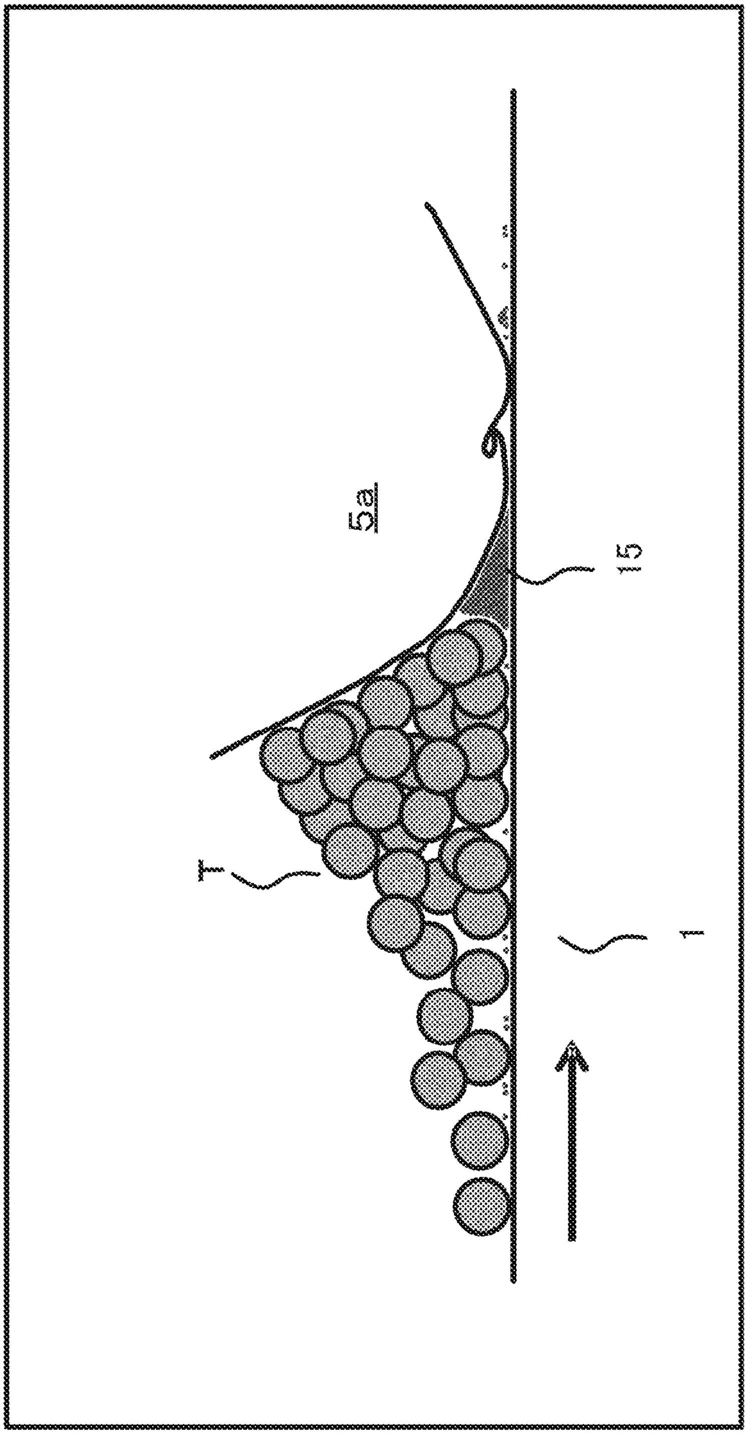
FIG. 3 is a diagram illustrating a state of cleaning at a leading end of a cleaning blade according to the first embodiment, the second embodiment and the third embodiment.

FIG. 3 is a required part enlarged schematic diagram of a leading end portion of the cleaning blade 5*a*. By transferring the silica particles to the photosensitive drum 1, as shown in FIG. 3, the silica particles are collected in the leading end of the cleaning blade 5*a*, a barrier layer, which is called a blocking layer 15, is formed, and then the toner T is prevented from passing through the cleaning blade 5*a*. In the first embodiment, a constant voltage is applied to the transfer roller 4 for a predetermined period of time, 5 seconds for example, immediately before "[2] the toner supplying operation period". Further, in the first embodiment, a driving speed of the driving portion 220 is half the speed at the time of the image forming during the initial operation; however, it is possible to obtain the effect in the first embodiment at any driving speed.

Description of the Initial Operation in the First Embodiment and Comparative Examples 1 Through 4

Figure 4:
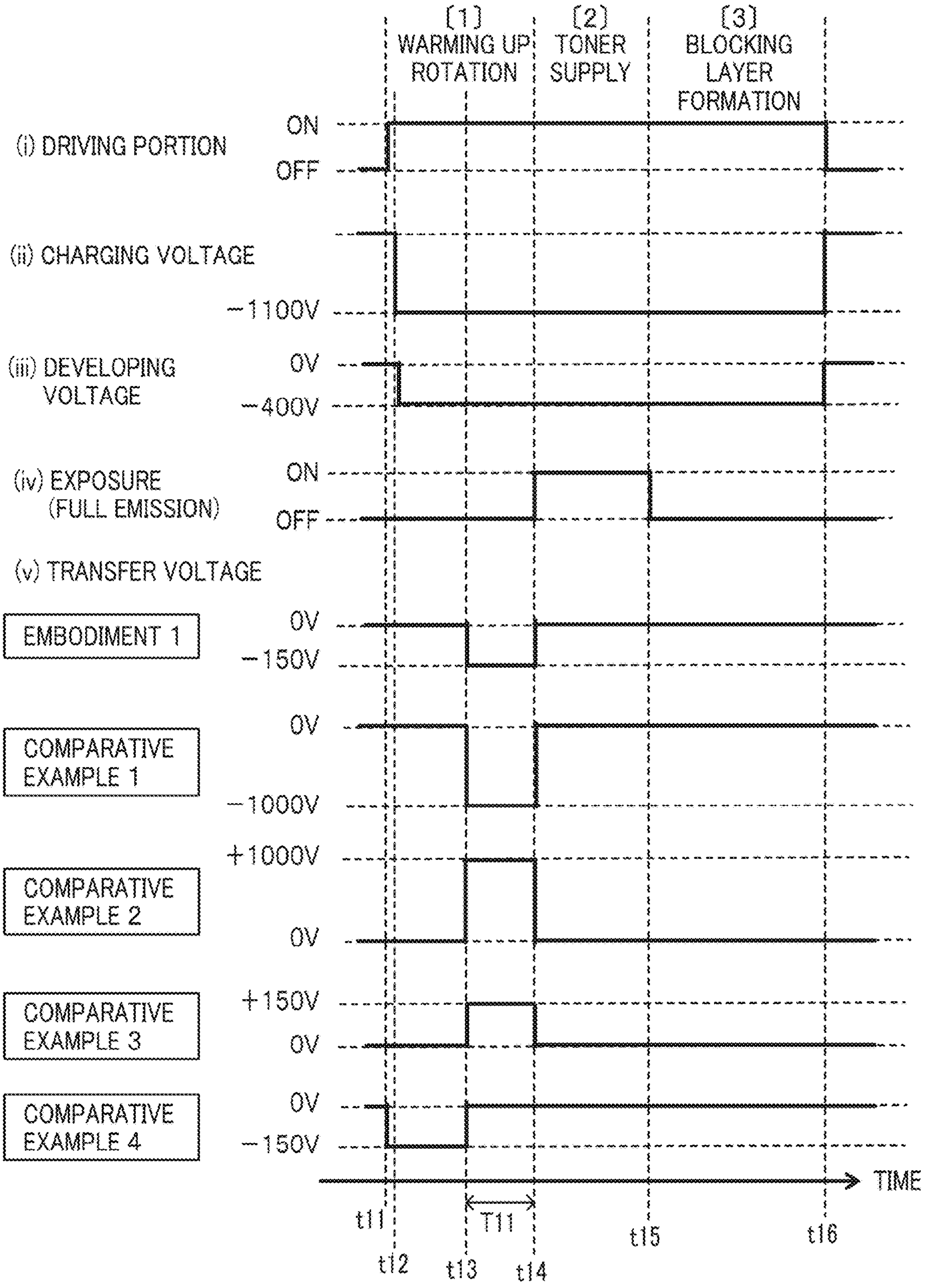
FIG. 4 is a sequence diagram of an initial operation according to the first embodiment.

Detailed sequences of the initial operation in the first embodiment and comparative examples 1 through 4 are shown in FIG. 4. In FIG. 4, (i) indicates driving (ON) and stopping (OFF) of the driving portion, (ii) indicates the charging voltage [V] which is applied to the charging roller 2, (iii) indicates the developing voltage [V] which is applied to the developing roller 8, and (iv) indicates exposure by the exposure device 6. Incidentally, exposure by the exposure device 6 is full emission at a maximum light intensity of a light source, and exposure of the full emission is defined as "ON" and non-exposure is defined as "OFF". In FIG. 4, (v) indicates the transfer voltage [V] which is applied to the transfer roller 4 of the first embodiment and the comparative examples from 1 through 4. A horizontal axis indicates time, and from t11 through t16 indicate each timing.

In the initial operation of the first embodiment and the comparative examples 1 through 4, an operation of the driving portion 220, an application of the charging voltage by the charging voltage power source 19, an application of the developing voltage by the developing voltage power source 18, and an operation of the exposure device 6 are common. That is, first of all, the driving portion 220 of the image forming apparatus 12 is turned on at the timing t11, and while the photosensitive drum 1 and the developing roller 8 are rotated, −1100V is applied to the charging roller 2 and −400V is applied to the developing roller 8 and the warming up rotation is performed after the timing t12. After that, at the timing t14, the exposure device 6 emits an exposure beam L of a maximum output (full emission) and forms the electrostatic latent image on the photosensitive drum 1, and the toner T is developed on the photosensitive drum 1. Therefore, the toner supplying operation is performed until the timing t15, and furthermore, after the subsequent blocking layer forming period, the initial operation is completed at the timing t16. Incidentally, at the completion of the initial operation at the timing t16, the driving portion 220 is turned off, the voltage application to the charging roller 2 is stopped, and the voltage application to the developing roller 8 is stopped. Incidentally, a period from the timing t11 to the timing t14 is [1] the warming up rotating period, a period from the timing t14 to the timing t15 is [2] the toner supplying operation period, and a period from the timing t15 to the timing t16 is [3] the blocking layer forming period.

In the first embodiment and the comparative examples from 1 through 3, the transfer voltage is applied to the transfer roller 4 by the transfer voltage power source 20 during a time T11 (a second period), for example 5 seconds, which is from the timing t13 to the timing t14, that is the warming up rotating period and just before the toner supplying operation period. Here, the voltage values of the constant voltage which are applied to the transfer roller 4 are different among the first embodiment and the comparative examples from 1 through 3. Specifically, a voltage of −150V, which is the same polarity as the toner's normal charging polarity (negative), is applied to the transfer roller 4 in the first embodiment, a voltage of −1000V is applied to the transfer roller 4 in the comparative example 1, a voltage of +1000V, which is the opposite polarity to the toner's normal charging polarity, is applied to the transfer roller 4 in the comparative example 2, and a voltage of +150V is applied to the transfer roller 4 in the comparative example 3. In the comparative example 4, first of all, a voltage of −150V is applied to the transfer roller 4 at the timing t11, when the warming up rotating period starts, and then 0V is applied at the timing t13, and the toner supplying operation is performed after the timing t14. That is, in the comparative example 4, the voltage is set to 0V just before the toner supplying operation period and then the toner supplying operation period starts.

Verification of the Effect of the First Embodiment

The effect of the first embodiment will be shown in Table 1. A test method is that a 50% halftone image is output after performing the initial operation in each of the first embodiment and the comparative examples from 1 through 3, and whether any vertical streaks due to cleaning defects occurred in the output image is checked and evaluated as a vertical streak occurrence level. Further, the test is conducted when an installation environment of the image forming apparatus 12 is at 15° C./10%.

TABLE 1

| | Vertical streak occurrence level |
|---|---|
| The first embodiment | A |
| The comparative example 1 | B |
| The comparative example 2 | C |
| The comparative example 3 | B |
| The comparative example 4 | B |

Vertical streak occurrence level
A: No vertical streak,
B: Some vertical streaks,
C: Many vertical streaks As shown in Table 1, no vertical streaks occurred in the first embodiment; however, vertical streaks occurred in the image in the comparative examples 1 through 4. In particular, in the comparative example 2, many vertical streaks occurred in the image.

In the First Embodiment, No Vertical Streaks Occurred

The reason why no vertical streaks occurred in the first embodiment will be described. During the warming up rotating period, some of Tospearl™ (particle size from 1 μm to 2 μm) which is initially applied to the surface of the developing roller 8, and some of the toner which is subsequently coated on the developing roller 8 transfer to the photosensitive drum 1. At this time, by applying a constant voltage of −150V to the transfer roller 4, among particles which are transferred to the photosensitive drum 1, only negative charged particles (polarity is negative) are sent to the cleaning blade 5*a*, and positive charged particles (polarity is positive) remain on the transfer roller 4.

As a result, the blocking layer 15 is immediately formed on an edge portion of the cleaning blade 5*a* as described in FIG. 3. A reason why the negative charged particle is sent to the cleaning blade 5*a* is that adhesion force of the negative charged particle to the photosensitive drum 1 is weaker and it is less likely to slip through the cleaning blade 5*a* so it is more likely to become the blocking layer. In this way, a simple blocking layer is formed in advance during the warming up rotating period, and the toner supply operation is performed after that. Therefore, cleaning defects may not occurr due to slipping of the toner through the edge portion of the cleaning blade 5*a*, even when a large amount of the toner reaches the cleaning blade 5*a* during the toner supplying operation period. Incidentally, during the warming up rotating period in the first embodiment, the thickness of the blocking layer 15 on the surface of the photosensitive drum 1 is approximately 10 μm in a peripheral direction. After that, during the blocking layer forming period, a final blocking layer is formed. During the blocking layer forming period in the first embodiment, the thickness of the blocking layer 15 on the surface of the photosensitive drum is 20 μm or more in the peripheral direction.

Comparative Example 1: Some Vertical Streaks Occurred

A reason why some vertical streaks occurred in the comparative example 1 is that a negative electrical discharge occurred between the transfer roller 4 and the photosensitive drum 1 by applying a transfer voltage of −1000V to the transfer roller 4. Micro-holes are formed on the surface of the photosensitive drum 1 due to the electrical discharge, and frictional force between the photosensitive drum 1 and the cleaning blade 5*a* is lowered since a contact area with the cleaning blade 5*a* is reduced. Therefore, an amount in which a leading end of the cleaning blade 5*a* is caught is reduced, a stress which is generated when rubber is caught is reduced, and a pressure of the cleaning blade 5*a* against the photosensitive drum 1 is decreased, so the toner is easier to slip through. Further, as another problem, since negative electrical discharge occurs between the transfer roller 4 and the photosensitive drum 1, a potential on the surface of the photosensitive drum 1 continues to rise during the warming up rotating period. Therefore, even when the full emission is exposed by the exposure device 6 during the toner supplying period, a light portion potential Vl becomes approximately-250V, and the amount of the toner which is supplied to the photosensitive drum 1 decreases, a problem that it is not able to appropriately supply the toner to the cleaning blade 5*a*.

Comparative Example 2: Many Vertical Streaks Occurred

The reason why many vertical streaks occurred in comparative example 2 is that a positive electrical discharge occurred between the transfer roller 4 and the photosensitive drum 1 since a voltage of +1000V is applied to the transfer roller 4. Similar to the comparative example 1, due to the electrical discharge, the friction force between the photosensitive drum 1 and the cleaning blade 5*a* decreases, and pressure of the cleaning blade 5*a* against the photosensitive drum 1 decreases and it is easier for the toner to slip through. Furthermore, during the warming up rotating period, Tospearl™ and the toner, which are transferred from the developing roller 8 to the photosensitive drum 1, are strongly positively charged (positively polarized) by the positive electrical discharge when they are passed through the transfer roller 4, and they enter the cleaning blade 5*a* in a state that adhesion force to the photosensitive drum 1 is strong. Such strongly positive material (strongly positively charged material) is easy to slip through the cleaning blade 5*a* and is not likely to become the blocking layer 15, so cleaning defects are likely to occur during the toner supplying period. In the comparative example 2, these two reasons are significant, and more vertical streaks occurred than in the comparative example 1.

Comparative Example 3: Some Vertical Streaks Occurred

The reason why some vertical streaks occurred in the comparative example 3 is that, unlike the first embodiment, Tospearl™ and the toner, which are positively charged are supplied to the cleaning blade 5*a* by applying a voltage of +150V to the transfer roller 4 during the warming up rotating period. Since the adhesion force of positively charged particles to the photosensitive drum 1 is high and it is difficult to form the blocking layer, it is not possible to form the blocking layer sufficiently by the toner supplying period and some vertical streaks occurred.

Comparative Example 4: Some Vertical Streaks Occurred

The reason why some vertical streaks occurred in the comparative example 4 is that a timing of applying −150V to the transfer roller 4 is not immediately before the toner supplying period. When after −150V voltage is applied to the transfer roller 4 once, it is set to be 0V and the toner supplying operation is performed, it is difficult to form the simple blocking layer in a 0V interval (from t13 to t14), and an amount which escapes from the cleaning blade 5*a* is increased and the blocking layer which has already been formed is depleted. Therefore, in the comparative example 4, some vertical streaks occurred.

As described above, by applying a negative polarity transfer voltage, which does not cause electrical discharge, to the transfer roller 4 during the warming up rotating period immediately before the toner supplying operation period during the initial operation as in the first embodiment, it is possible to provide the image forming apparatus which does not cause cleaning defects.

Incidentally, the toner supplying during the toner supplying period in the first embodiment may be divided. For example, "the toner is supplied for 25 mm and the toner is not supplied for 25 mm" may be repeated ten times. That is, the control portion 100 does not need to continuously supply the toner in the toner supplying interval, and it may control so that there are multiple intervals including the intervals in which the toner is supplied and the intervals in which the toner is not supplied. As described above, the control portion 100 may perform alternately between supplying the toner and stopping the toner supply. Therefore, since the toner T does not enter the cleaning blade 5*a* continuously, it is possible to reduce possibility of collapsing the simple blocking layer which is formed during the warming up rotating period.

Further, it is also possible to apply the method in the first embodiment in a case that the negative voltage of the transfer roller 4 and the charging roller 2 in the first embodiment is the same high voltage in the image forming apparatus 12, that is, it is supplied from the same power source. That is, even when a configuration is that the charging voltage of −1100V is applied to the charging roller 2 and the same −1100V voltage is applied to the transfer roller 4, it is possible to apply the same method in the first embodiment. In the case, the constant voltage of +950V is applied to the transfer roller 4 as a positive voltage. As a result, a voltage of −150V (=−1100V+950V) is applied to the transfer roller 4, and the same effect as in the first embodiment 1 may be obtained. Incidentally, the configuration is also the same for a transfer voltage which is applied during the blocking layer forming period, which will be described in embodiments as follow.

Thus, according to the first embodiment, it is possible to prevent the occurrence of the cleaning defects during an initial rotation to transit the process cartridge in the brand-new state to the state that it is possible to print.

Second Embodiment

In the second embodiment, the transfer voltage which is applied to the transfer roller 4 is adjusted even during [3] the blocking layer forming period during the initial operation. By applying the second embodiment, it is possible to prevent the occurrence of the cleaning defects even in a case that the installation environment of the image forming apparatus 12 is 5° C./30% in which performance of the cleaning blade is lower.

Description of the Initial Operation of the Second Embodiment and the Comparative Examples from 5 Through 7

Figure 5:
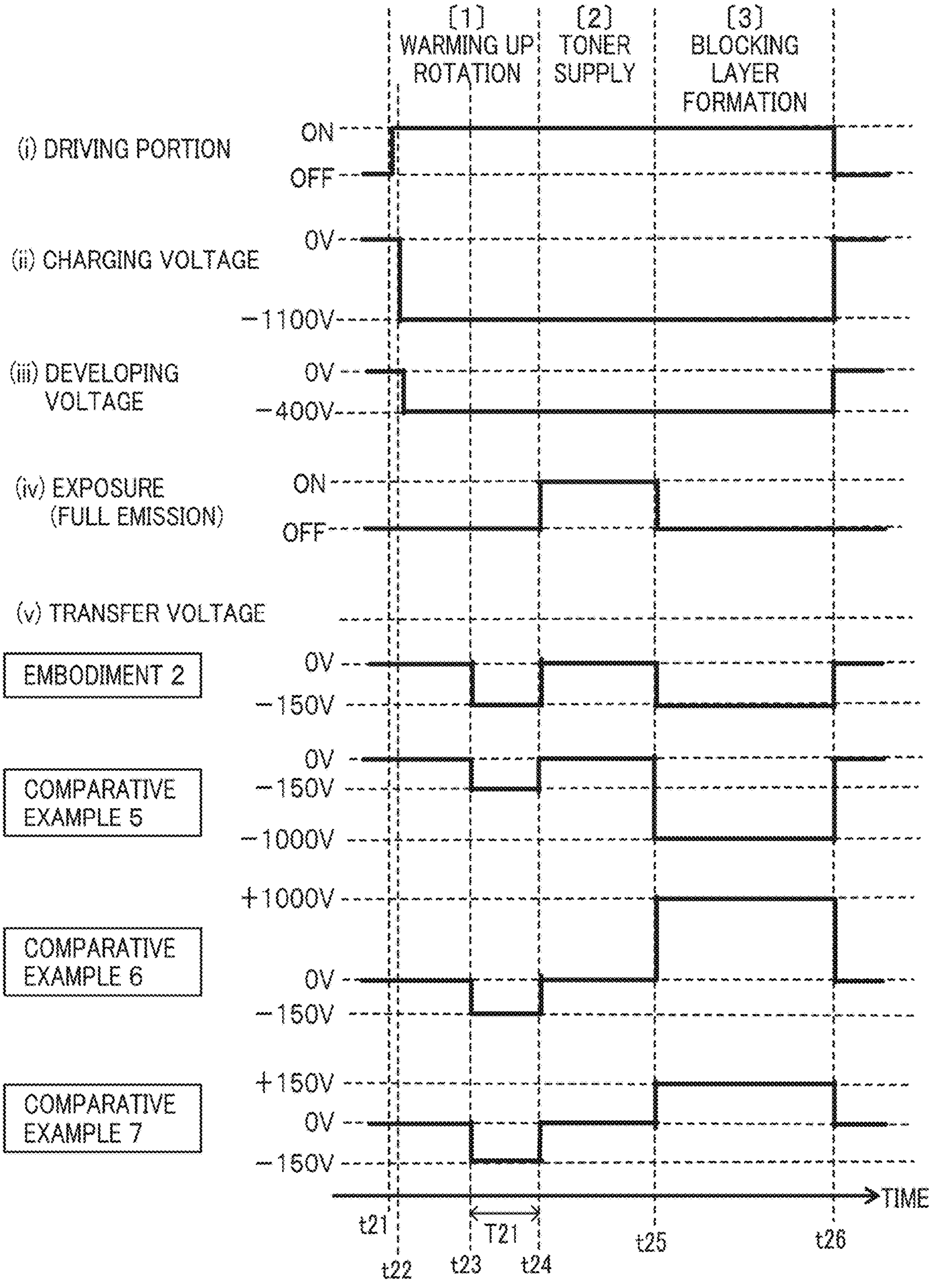
FIG. 5 is a sequence diagram of an initial operation according to the second embodiment.

FIG. 5 shows detailed sequences during the initial operation in the second embodiment and the comparative examples 5 through 7. From (i) through (iv) of FIG. 5 are similar to the first embodiment. Further, from t21 through t26 indicate timings, respectively. Even in the second embodiment and the comparative examples 5 through 7, the charging voltage application to the driving portion 220 and the charging roller 2, the developing voltage application to the developing roller 8 and the operation of the exposure device 6 are common, similar to the first embodiment. Furthermore, a voltage other than 0V is applied to the transfer roller 4 during the warming up rotating period. That is, the transfer voltage of −150V is applied to the transfer roller 4 during a time T21 from a timing t23 to a timing t24 as a second period. Incidentally, a period from the timing t21 to the timing t24 is [1] the warming up rotating period, a period from the timing t24 to the timing t25 is [2] the toner supplying operation period and a period from the timing t25 to the timing t26 is [3] the blocking layer forming period.

Voltage values of the constant voltages which are applied to the transfer roller 4 during the blocking layer forming period are different in the second embodiment and the comparative examples from 5 through 7. Specifically, −150V in the second embodiment, −1000V in the comparative example 5, +1000V in the comparative example 6 and +150V in the comparative example 7 are applied to the transfer roller 4, respectively. Further, descriptions will be omitted regarding ones other than the configurations which are described so far, since they are similar to the first embodiment.

Verification of the Effect of the Second Embodiment

The effect of the second embodiment will be shown in Table 2. A test method is that a 50% halftone image is output after performing the initial operation in each of the second embodiment and the comparative examples from 5 through 7, and whether any vertical streaks due to cleaning defects occurred in the output image is checked and evaluated as a vertical streak occurrence level. Further, the test is conducted when an installation environment of the image forming apparatus 12 is at 15° C./10% and at 5° C./30%.

TABLE 2

| | Vertical streak occurrence level | |
|---|---|---|
| | 15° C./10% | 5° C./30% |
| The second embodiment | A | A |
| The comparative example 5 | A | B |
| The comparative example 6 | A | B |
| The comparative example 7 | A | A |

Vertical streak occurrence level
A: No vertical streak,
B: Some vertical streaks,
C: Many vertical streaks As shown in Table 2, no vertical streaks occurred in each of the second embodiment and the comparative examples from 5 through 7 under the installation environment of the image forming apparatus 12 at 15° C./10%. However, under the installation environment of the image forming apparatus 12 at 5° C./30%, no vertical streaks occurred in the second embodiment, but some vertical streaks occurred in the comparative examples 5 and 6. Incidentally, no vertical streaks occurred in the comparative example 7.

In the Second Embodiment, No Vertical Streaks Occurred

The reason why no vertical streaks occurred in the second embodiment will be described. During the blocking layer forming period in the second embodiment, the voltage which is applied to the transfer roller 4 is −150V, so electrical discharge does not occur between the transfer roller 4 and the photosensitive drum 1. Therefore, the frictional force between the cleaning blade 5*a* and the photosensitive drum 1 is maintained and the leading end of the cleaning blade 5*a* is caught properly and the pressure is generated. Thus, the cleaning defects did not occur even in the installation environment of 5° C./30%. The cleaning defects did not occur in the comparative example 7 for the same reason. In the comparative example 7, the voltage application during the warming up rotating period is the same as in the second embodiment 2, and an absolute value of the voltage application during the blocking layer forming period is the same but its polarity is different. According to the test results of the second embodiment and the comparative example 7, voltage applications during the blocking layer forming period are good with either positive or negative polarity as long as the absolute value of the voltage does not cause electrical discharge.

On the other hand, in the comparative examples 5 and 6, the frictional force between the cleaning blade 5*a* and the photosensitive drum 1 is reduced since the electrical discharge between the transfer roller 4 and the photosensitive drum 1 occurred, as also described in the first embodiment. During the blocking layer forming period, a large amount of the toner which is supplied during the toner supplying period remains at the edge portion of the cleaning blade 5*a*, and the pressure of the cleaning blade 5*a* against the photosensitive drum 1 is reduced. Therefore, the cleaning defects occurred.

As described above, by applying the voltage to the transfer roller 4, in which electrical discharge did not occur, during the blocking layer forming period in the initial operation as in the second embodiment, it is possible to provide the image forming apparatus in which the cleaning defects did not occur. For example, even in a case that the image forming apparatus is installed in the environment of 5° C./30%, it is possible to prevent the occurrence of the cleaning defects in the initial operation. Thus, according to the second embodiment, it is possible to prevent the occurrence of the cleaning defects during the initial rotation to transit the process cartridge in the brand-new state to the state that it is possible to print.

Third Embodiment

In a third embodiment, there are two or more types of the process cartridges 13 which are mountable on the image forming apparatus 12, and the surface layer material of the photosensitive drum 1 which is used in each process cartridge 13 is different. Therefore, an amount of the surface layer of the photosensitive drum 1 which is abraded per 1,000 sheets (hereinafter, referred to as a photosensitive drum abrasion rate) is different in a case that a durability test of each process cartridge 13 is conducted. By controlling the voltage which is applied to the transfer roller 4 in each process cartridge 13 during [1] the warming up rotating period and [3] the blocking layer forming period of the initial operation, it is possible to prevent the occurrence of the cleaning defects.

Description of the Configuration and the Initial Operation of an Embodiment 3-1, an Embodiment 3-2, and the Comparative Examples 8 and 9

First of all, a difference, between materials of the surface layers of the two types of the photosensitive drums 1 which are used in the third embodiment, will be described. In the embodiment 3-1 and the comparative examples 8 and 9, a material which is applied to the surface layer of the photosensitive drum 1 is softer than a material which is applied to that in the embodiments 1 and 2 and the comparative examples from 1 through 7. Specifically, the material of the surface layer of the photosensitive drum 1 which is applied in the embodiment 3-1 and the comparative examples 8-9 is polycarbonate resin. On the other hand, the material of the surface layer of the photosensitive drum 1 which is applied in the first embodiment, the second embodiment, the embodiment 3-2 and the comparative examples from 1 through 7 is polyarylate resin.

As a result, the photosensitive drum abrasion rate per 1000 sheets is 0.4 μm for the polycarbonate resin and 0.2 μm for the polyarylate resin. Furthermore, these values are stored as information in the nonvolatile memory 9 which is mounted on the process cartridge 13. The information on the photosensitive drum abrasion rate is configured so that it is possible to communicate by a contact via an electrical contact (unshown in figures) between the control portion 100 of the image forming apparatus 12 and the nonvolatile memory 9. Incidentally, the information about the photosensitive drum abrasion rate may be stored in the ROM 102.

Figure 6:
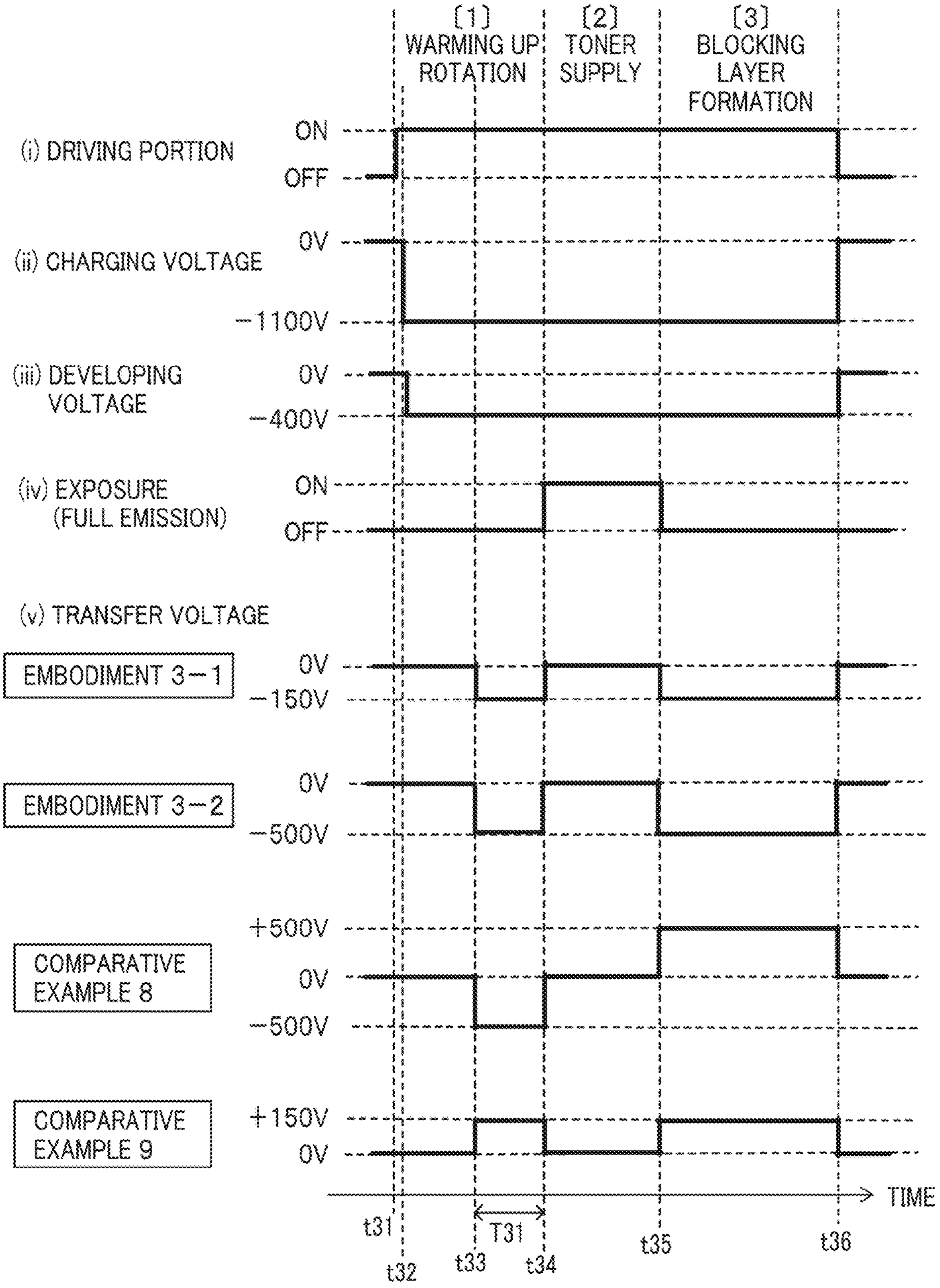
FIG. 6 is a sequence diagram of an initial operation according to the third embodiment.

In the third embodiment, by using the information about the photosensitive drum abrasion rate which is stored in the nonvolatile memory 9, a range of the voltage which is applied to the transfer roller 4 during the initial operation is changed when two types of the photosensitive drums 1 whose abrasion rates are different are used. Specifically, when the photosensitive drum is a second image bearing member in which the photosensitive drum abrasion rate is large and 0.4 (a second value), the control portion 100 controls the voltage which is applied to the transfer roller 4 during the initial operation to be −200V or more and −100V or less. On the other hand, when the photosensitive drum is a first image bearing member in which the photosensitive drum abrasion rate is small and 0.2 (a first value), the control portion 100 controls the voltage which is applied to the transfer roller 4 during the initial operation to be −550V or more and less than −100V. That is, the control portion 100 narrows a range of the voltage in which it is possible to apply to the transfer roller 4 in a case that the photosensitive drum abrasion rate is large, compared to a case that the photosensitive drum abrasion rate is small. From (i) through (iv) of FIG. 6 are similar to the first embodiment. Further, from t31 through t36 indicate timings respectively. In the embodiment 3-1, the embodiment 3-2 and the comparative examples 8 and 9, the operation of the driving portion 220, the application of the charging voltage of the charging roller 2, the application of the charging voltage by the developing roller 8 and the operation of the exposure device 6 are common, similar to the first embodiment. Incidentally, a period from the timing t31 to the timing t34 is [1] the warming up rotating period, a period from the timing t34 to the timing t35 is [2] the toner supplying operation period, and a period from the timing t35 to the timing t36 is [3] the blocking layer forming period. Descriptions will be omitted regarding configurations other than the configurations which are described so far, since they are similar to the first embodiment.

In such configuration, differences in the sequences of the initial operations in the embodiment 3-1, the embodiment 3-2, and the comparative examples 8 and 9 will be described. Specifically, the voltage values of the constant voltage which are applied to the transfer roller 4 are different.

In the embodiment 3-1, the voltage value of the constant voltage which is applied to the transfer roller 4 during the warming up rotating period and the blocking layer forming period is −150V.

In the embodiment 3-2, the voltage value of the constant voltage which is applied to the transfer roller 4 during the warming up rotating period and the blocking layer forming period is −500V.

In the comparative example 8, the voltage value of the constant voltage which is applied to the transfer roller 4 during the warming up rotating period is −500V and the voltage value of the constant voltage which is applied to the transfer roller 4 during the blocking layer forming period is +500V.

In the comparative example 9, the voltage value of the constant voltage which is applied to the transfer roller 4 during the warming up rotating period and the blocking layer forming period is +150V.

Verification of the Effect of the Embodiment 3-1 and the Embodiment 3-2

The effect of the embodiment 3-1 and the embodiment 3-2 will be shown in Table 3. A test method is that a 50% halftone image is output after performing the initial operation in each of the embodiment 3-1, the embodiment 3-2 and the comparative examples 8 and 9, and whether any vertical streaks due to cleaning defects occurred in the output image is checked. Further, the test is conducted when the installation environment of the image forming apparatus 12 is at 15° C./10%.

TABLE 3

| | Vertical streak occurrence level |
|---|---|
| The embodiment 3-1 | A |
| The embodiment 3-2 | A |
| The comparative example 8 | B |
| The comparative example 9 | B |

Vertical streak occurrence level
A: No vertical streak,
B: Some vertical streaks,
C: Many vertical streaks As shown in Table 3, no vertical streaks occurred in the embodiment 3-1 and the embodiment 3-2; however, some vertical streaks occurred in the image in the comparative examples 8 and 9.

In the Third Embodiment, No Vertical Streaks Occurred

The reason why no vertical streaks occurred in the embodiment 3-1 will be described. The photosensitive drum abrasion rate of the photosensitive drum 1 in the embodiment 3-1 is larger than that in the first embodiment, and is more easily abraded. That is, the photosensitive drum 1 according to the embodiment 3-1 corresponds to the one with a large photosensitive drum abrasion rate of 0.4 as described above. Therefore, the amount of abrasive powder from the photosensitive drum which is interposed between the photosensitive drum 1 and the cleaning blade 5*a* also increases, and the frictional force between the photosensitive drum 1 and the cleaning blade 5*a* decreases. Thus, the amount of the leading end of the cleaning blade 5*a*, which is caught, is decreased, and the pressure of the cleaning blade 5*a* against the photosensitive drum 1 is also decreased, so it becomes in a state that the cleaning defect easily occurred.

Even in such a state, by applying the transfer voltage of −150V to the transfer roller 4 during the warming up rotating period (time T31) and the blocking layer forming period, a cleaning performance is maintained for the reason which is described in the first embodiment. The voltage value of −150V is within the range of −200V or more and −100V or less, which is the voltage value which applied to the transfer roller 4 when the photosensitive drum abrasion rate is large and 0.4 which is described above.

Further, the reason why no vertical streaks occurred in the embodiment 3-2 will be described. In the embodiment 3-2, the photosensitive drum abrasion rate is smaller than in embodiment 3-1. That is, the photosensitive drum 1 according to the embodiment 3-2 corresponds to the one whose photosensitive drum abrasion rate is small and 0.2 which is described above. For this reason, the amount of the leading end of the cleaning blade 5*a* which is caught is also larger than in the embodiment 3-1. Therefore, since it is in a state that the cleaning defects may not likely occur, even when the voltage which is applied to the transfer roller 4 is set to be −500V during the warming up rotating period (time T31) and the blocking layer forming period, the cleaning defects did not occur. The voltage value of −500V is within the range of −550V or more and −0V or less of the voltage value which is applied to the transfer roller 4 when the photosensitive drum abrasion rate is small and 0.2 which is described above.

Comparative Examples 8 and 9: Some Vertical Streaks Occurred

Further, in the comparative example 8, since the voltage value, which is close to the voltage (−550V) at which electrical discharge occur between the transfer roller 4 and the photosensitive drum 1, is applied, electrical discharge sometimes occurred due to variations in high voltage parts of the image forming apparatus 12 in reality. Therefore, the cleaning defects are likely to occur for the reason which is described in the first embodiment. Furthermore, material, which is applied to the surface layer of the photosensitive drum 1, is soft and is likely to cause the cleaning defects, so some vertical streaks occurred. The photosensitive drum 1 according to the comparative example 8 corresponds to the one whose photosensitive drum abrasion rate is large and 0.4, which is described above. Both of the voltage values of −500V and +500V are not within the range of −200V or more and −100V or less, which is the voltage value which is applied to the transfer roller 4 when the photosensitive drum abrasion rate large and 0.4 as described above.

Further, in the comparative example 9, +150V is applied to the transfer roller 4 during the warming up rotating period, so electrical discharge did not occur, however, some vertical streaks occurred since the toner supplying operation is performed without forming a simple blocking layer as described in the first embodiment. The photosensitive drum 1 according to the comparative example 9 corresponds to the one whose photosensitive drum abrasion rate is large and 0.4, which is described above. The voltage value of +150V is not within the range of −200V or more and −100V or less, which is the voltage value which is applied to the transfer roller 4 when the photosensitive drum abrasion rate large and 0.4,which is described above.

As described above, by applying more appropriate voltage to the transfer roller 4, it is possible to provide the image forming apparatus in which the cleaning defects did not occur, even in a state in which the photosensitive drum abrasion rate is high and the cleaning defect is likely to occur as in the third embodiment. Thus, according to the third embodiment, it is possible to prevent the occurrence of the cleaning defects during the initial rotation to transit the process cartridge in the brand-new state to the state that it is possible to print.

OTHER EMBODIMENTS

In the embodiments which are described above, the image forming apparatus in which the developing roller always contacts the photosensitive drum and a contacting/spacing mechanism is not included, is described; however, the image forming apparatus may include the contacting/spacing mechanism. That is, the control portion 100 only needs to keep the photosensitive drum and the developing roller in contact with each other by the contacting/spacing mechanism before the driving portion 220 rotates the photosensitive drum 1 in the initial operation. The present invention may also be realized by a process which supplies a program, which realizes one or more functions of the embodiments which are described above, to a system or a device through a network or a storage medium, and reads and executes the program by one or more processors in a computer of the system or the device. Further, it may also be realized by a circuit (for example, an ASIC), which realizes one or more functions.

The disclosure of the embodiments includes following configurations.

(First Configuration)

An image forming apparatus comprising: a rotatable image bearing member; a developing member configured to supply toner on a surface of the image bearing member in a developing region contacting the image bearing member and form a toner image; a transferring member configured to transfer the toner image to a transfer member from the image bearing member; an applying means configured to apply a voltage to the transfer member; a cleaning blade configured to clean the toner remaining on the image bearing member after transferring the toner image to the transfer member; and a controlling portion configured to execute an initial operation in which the image bearing member in a brand-new state is shifted to a printable state and an image forming operation in which the toner image is formed on the transfer member, wherein the controlling portion controls the applying means so as to apply a constant voltage to the transfer member in the initial operation different from that in the image forming operation, during a second period immediately before a first period for supplying the toner from the developing member to the image bearing member in the developing region, and controls the applying means so that the constant voltage applied to the transfer member in the second period has a normal charge polarity of the toner and becomes a voltage value which does not generate electrical discharge between the image bearing member and the transfer member.

(Second Configuration)

The image forming apparatus according to the first configuration, wherein when the normal charge polarity of the toner is negative, the controlling portion controls the applying means so that the constant voltage applied to the transfer member in the second period is equal to −550 V or more and less than 0 V.

(Third Configuration)

The image forming apparatus according to the first configuration, wherein the controlling portion controls the applying means so that the constant voltage applied to the transfer member in the second period is −220 V or more and −100 V or less.

(Fourth Configuration)

The image forming apparatus according to either of the first configuration, the second configuration or the third configuration, wherein the controlling portion controls the applying means so that the constant voltage applied to the transfer member in a third period after the first period becomes a voltage value which does not generate electrical discharge between the image bearing member and the transfer member.

(Fifth Configuration)

The image forming apparatus according to the fourth configuration, wherein the controlling portion controls the applying means so that the constant voltage applied to the transfer member in the third period is −550 V or more and +550 V or less.

(Sixth Configuration)

The image forming apparatus according to the fourth configuration or the fifth configuration, further comprising a charging member configured to uniformly charge the surface of the image bearing member; and a second applying means configured to apply a voltage to the charging member when the applying means is defined as a first applying means, wherein the controlling portion controls the first applying means and the second applying means in the third period so that the same voltage as the voltage applied to the charging member by the second applying means is applied to the transfer member, a voltage having an opposite polarity to a polarity of the voltage applied by the second applying means is applied to the transfer member by the first applying means, and the voltage applied to the transfer member becomes the constant voltage.

(Seventh Configuration)

The image forming apparatus according to any from the first configuration through the sixth configuration, wherein the controlling portion controls so that there are a plurality of sections where the toner is supplied and a plurality of sections where the toner is not supplied in the first period.

(Eighth Configuration)

The image forming apparatus according to any from the first configuration through the seventh configuration, further comprising a charging member configured to uniformly charge the surface of the image bearing member; and a second applying means configured to apply a voltage to the charging member when the applying means is defined as a first applying means, wherein the controlling portion controls the first applying means and the second applying means in the second period so that the same voltage as the voltage applied to the charging member by the second applying means is applied to the transfer member, a voltage having an opposite polarity to a polarity of the voltage applied by the second applying means is applied to the transfer member by the first applying means, and the voltage applied to the transfer member becomes the constant voltage.

(Ninth Configuration)

The image forming apparatus according to any from the first configuration through the eighth configuration, wherein a first image bearing member, of which an abrasion ratio of the surface of the image bearing member is a first value, and a second image bearing member, of which a surface is softer than that of the first image bearing member and of which the abrasion ratio is a second value larger than the first value, are mountable to the image forming apparatus, and wherein a range of a voltage including the constant voltage applied to the transfer member when the second image bearing member is mounted is narrower than a range of a voltage including the constant voltage.

(Tenth Configuration)

The image forming apparatus according to the ninth configuration, further comprising a memory portion configured to memorize information on the abrasion ratio; and a cartridge including the memory portion and the image bearing member.

(Eleventh Configuration)

The image forming apparatus according to any one from the first configuration through the tenth configuration, wherein the developing member includes a toner bearing member configured to contact the image bearing member, and wherein the toner bearing member, in a brand-new state, has a surface is applied with a lubricant including at least a lubricant having the same polarity as the normal charge polarity of the toner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-038969 filed on Mar. 13, 2024, which is hereby incorporated by reference herein in its entirety.

What is claimed is:

1. An image forming apparatus comprising:

a rotatable image bearing member;

a developing member configured to supply toner on a surface of the image bearing member in a developing region contacting the image bearing member and form a toner image;

a transfer member configured to transfer the toner image to a transfer material from the image bearing member;

an applying means configured to apply a voltage to the transfer member;

a cleaning blade configured to clean the toner remaining on the image bearing member after transferring the toner image to the transfer material; and a controlling portion configured to execute an initial operation in which the image bearing member in a brand-new state is shifted to a printable state and an image forming operation in which the toner image is formed on the transfer material, wherein the controlling portion controls the applying means so as to apply a constant voltage to the transfer member in the initial operation different from that in the image forming operation, during a second period immediately before a first period for supplying the toner from the developing member to the image bearing member in the developing region, and controls the applying means so that the constant voltage applied to the transfer member in the second period has a normal charge polarity of the toner and becomes a voltage value which does not generate electrical discharge between the image bearing member and the transfer member.

2. The image forming apparatus according to claim 1, wherein when the normal charge polarity of the toner is negative, the controlling portion controls the applying means so that the constant voltage applied to the transfer member in the second period is equal to −550 V or more and less than 0 V.

3. The image forming apparatus according to claim 1, wherein the controlling portion controls the applying means so that the constant voltage applied to the transfer member in the second period is −220 V or more and −100 V or less.

4. The image forming apparatus according to claim 1, wherein the controlling portion controls the applying means so that the constant voltage applied to the transfer member in a third period after the first period becomes a voltage value which does not generate electrical discharge between the image bearing member and the transfer member.

5. The image forming apparatus according to claim 4, wherein the controlling portion controls the applying means so that the constant voltage applied to the transfer member in the third period is −550 V or more and +550 V or less.

6. The image forming apparatus according to claim 4, further comprising:

a charging member configured to uniformly charge the surface of the image bearing member; and a second applying means configured to apply a voltage to the charging member when the applying means is defined as a first applying means, wherein the controlling portion controls the first applying means and the second applying means in the third period so that the same voltage as the voltage applied to the charging member by the second applying means is applied to the transfer member, a voltage having an opposite polarity to a polarity of the voltage applied by the second applying means is applied to the transfer member by the first applying means, and the voltage applied to the transfer member becomes the constant voltage.

7. The image forming apparatus according to claim 1, wherein the controlling portion controls so that there are a plurality of sections where the toner is supplied and a plurality of sections where the toner is not supplied in the first period.

8. The image forming apparatus according to claim 1, further comprising:

a charging member configured to uniformly charge the surface of the image bearing member; and a second applying means configured to apply a voltage to the charging member when the applying means is defined as a first applying means, wherein the controlling portion controls the first applying means and the second applying means in the second period so that the same voltage as the voltage applied to the charging member by the second applying means is applied to the transfer member, a voltage having an opposite polarity to a polarity of the voltage applied by the second applying means is applied to the transfer member by the first applying means, and the voltage applied to the transfer member becomes the constant voltage.

9. The image forming apparatus according to claim 1, wherein a first image bearing member of which an abrasion ratio of the surface of the image bearing member is a first value, and a second image bearing member of which a surface is softer than that of the first image bearing member and of which the abrasion ratio is a second value larger than the first value are mountable to the image forming apparatus, and wherein a range of a voltage including the constant voltage applied to the transfer member when the second image bearing member is mounted is narrower than a range of a voltage including the constant voltage applied to the transfer member when the first image bearing member is mounted.

10. The image forming apparatus according to claim 9, further comprising:

a memory portion configured to memorize information on the abrasion ratio; and a cartridge including the memory portion and the image bearing member.

11. The image forming apparatus according to claim 1, wherein the developing member includes a toner bearing member configured to contact the image bearing member, and wherein, in a brand-new state, a surface of the toner bearing member is applied with a lubricant including at least a lubricant having the same polarity as the normal charge polarity of the toner.

* * * * *